(12) United States Patent
Kawasaki

(10) Patent No.: US 8,006,060 B2
(45) Date of Patent: Aug. 23, 2011

(54) APPARATUS FOR SUPPORTING CREATION OF ACCESS PATH FROM HOST TO LOGICAL VOLUME

(75) Inventor: Naoto Kawasaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 758 days.

(21) Appl. No.: 12/068,217

(22) Filed: Feb. 4, 2008

(65) Prior Publication Data

US 2009/0150638 A1    Jun. 11, 2009

(30) Foreign Application Priority Data

Dec. 5, 2007    (JP) ................. 2007-314575

(51) Int. Cl.
*G06F 12/02* (2006.01)
(52) U.S. Cl. .......... 711/170; 711/112; 711/171; 710/38; 710/316
(58) Field of Classification Search .................. 711/170, 711/171, 112; 710/38, 316
See application file for complete search history.

(56) References Cited

U.S. PATENT DOCUMENTS

2003/0149813 A1 * 8/2003 Bouchet ..................... 710/38
2007/0206224 A1   9/2007 Nagashima et al.

FOREIGN PATENT DOCUMENTS

JP    2007-233901    3/2006

* cited by examiner

*Primary Examiner* — Jae U Yu
(74) *Attorney, Agent, or Firm* — Volpe and Koenig, P.C.

(57) ABSTRACT

A path creation support apparatus acquires beforehand, from a storage system or a host, either a portion of the parameters required for path creation or parameter decision information which is information for deciding this portion of the parameters. The path creation support apparatus decides the portion of the parameters based on the parameter decision information. Upon receipt of an access path creation start request, the path creation support apparatus sends to the host and the storage system an access path creation indication which specifies the parameters specified together with the access path creation start request, and either the parameters acquired beforehand or the parameters decided based on the parameter decision information acquired beforehand.

10 Claims, 10 Drawing Sheets

FIG. 3

HSD MANAGEMENT TABLE 329

| HSD | HOST MODE | OS TYPE |
|---|---|---|
| HSD-A | HOST MODE A | OS-A |
| HSD-B | HOST MODE B | OS-B |
| : | : | : |

Columns: 3291, 3292, 3293

FIG. 4

VOL MANAGEMENT TABLE 320

| VOL ID | RESIDUAL CAPACITY |
|---|---|
| SV01 | 300GB |
| SV02 | 20GB |
| SV03 | 1TB |
| SV04 | 500GB |
| SV05 | 10GB |
| : | : |

Columns: 3201, 3202

FIG. 5

AP RUN STATUS MANAGEMENT TABLE 32A

| HOST | AP | ACCESS STATUS | ALTERNATIVE PATH |
|---|---|---|---|
| HOST A | AP1 | ACCESS | YES |
| HOST B | AP2 | ACCESS | NO |
| HOST C | AP3 | NO ACCESS | YES |
| ⋮ | ⋮ | ⋮ | ⋮ |

FIG. 6

AP RUN CONFIGURATION MANAGEMENT TABLE 32B

| HOST | AP | CONTINUOUSLY-RUNNING |
|---|---|---|
| HOST A | AP1 | YES |
| HOST B | AP2 | NO |
| HOST C | AP3 | NO |
| ⋮ | ⋮ | ⋮ |

APPARATUS FOR SUPPORTING CREATION OF ACCESS PATH FROM HOST TO LOGICAL VOLUME

CROSS-REFERENCE TO PRIOR APPLICATION

This application relates to and claims the benefit of priority from Japanese Patent Application number 2007-314575, filed on Dec. 5, 2007, the entire disclosure of which is incorporated herein by reference.

BACKGROUND OF THE INVENTION

1. Field of the Invention

The present invention relates to technology for creating an access path from a host to a logical volume inside a storage system.

2. Description of the Related Art

Japanese Patent Laid-Open No. 2007-233901 discloses technology by which a management server, which is connected to a host computer (hereinafter, "host"), and a storage system create a path (hereinafter, an "access path") from the host to a logical volume provided by the storage system.

Normally, a user must input various parameters into the host to create an access path (to include changing to the newly-created access path). As parameters that have to be inputted to the host, for example, there are the parameters (for example, a LUN (Logical Unit Number), port ID, logical volume ID, and so forth) for specifying the access path (either the newly created access path or the change-targeted access path). Further, when the storage system is accessed by a plurality of hosts, a parameter that must be inputted is information showing the host storage domain to which the newly created access path belongs. Deciding appropriate values for each of these various parameters, and inputting these values into the host is an arduous task for the user.

Further, changing an access path must be carried out in a state in which the access path targeted for this change is not being utilized. Therefore, it is preferable that the user check the utilization status of the access path targeted for change when changing the access path so that the access path change can be carried out normally. However, the job of checking the utilization status of an access path is a troublesome task for the user.

SUMMARY OF THE INVENTION

Accordingly, an object of the present invention is to reduce the burden on the user when creating an access path.

A path creation support apparatus acquires beforehand, from a storage system or a host, either a portion of the parameters required for path creation or parameter decision information which is information for deciding this portion of the parameters. The path creation support apparatus decides the portion of the parameters based on the parameter decision information. Upon receipt of an access path creation start request, the path creation support apparatus sends to the host and the storage system an access path creation indication which specifies the parameters specified together with the access path creation start request, and either the parameters acquired beforehand or the parameters decided based on the parameter decision information acquired beforehand.

BRIEF DESCRIPTION OF THE DRAWINGS

FIG. 3 is a diagram showing an example of an HSD management table;

FIG. 4 is a diagram showing an example of a VOL management table;

FIG. 5 is a diagram showing an example of an AP run status management table;

FIG. 6 is a diagram showing an example of an AP run configuration management table;

DETAILED DESCRIPTION OF THE PREFERRED EMBODIMENT

Figure 1:
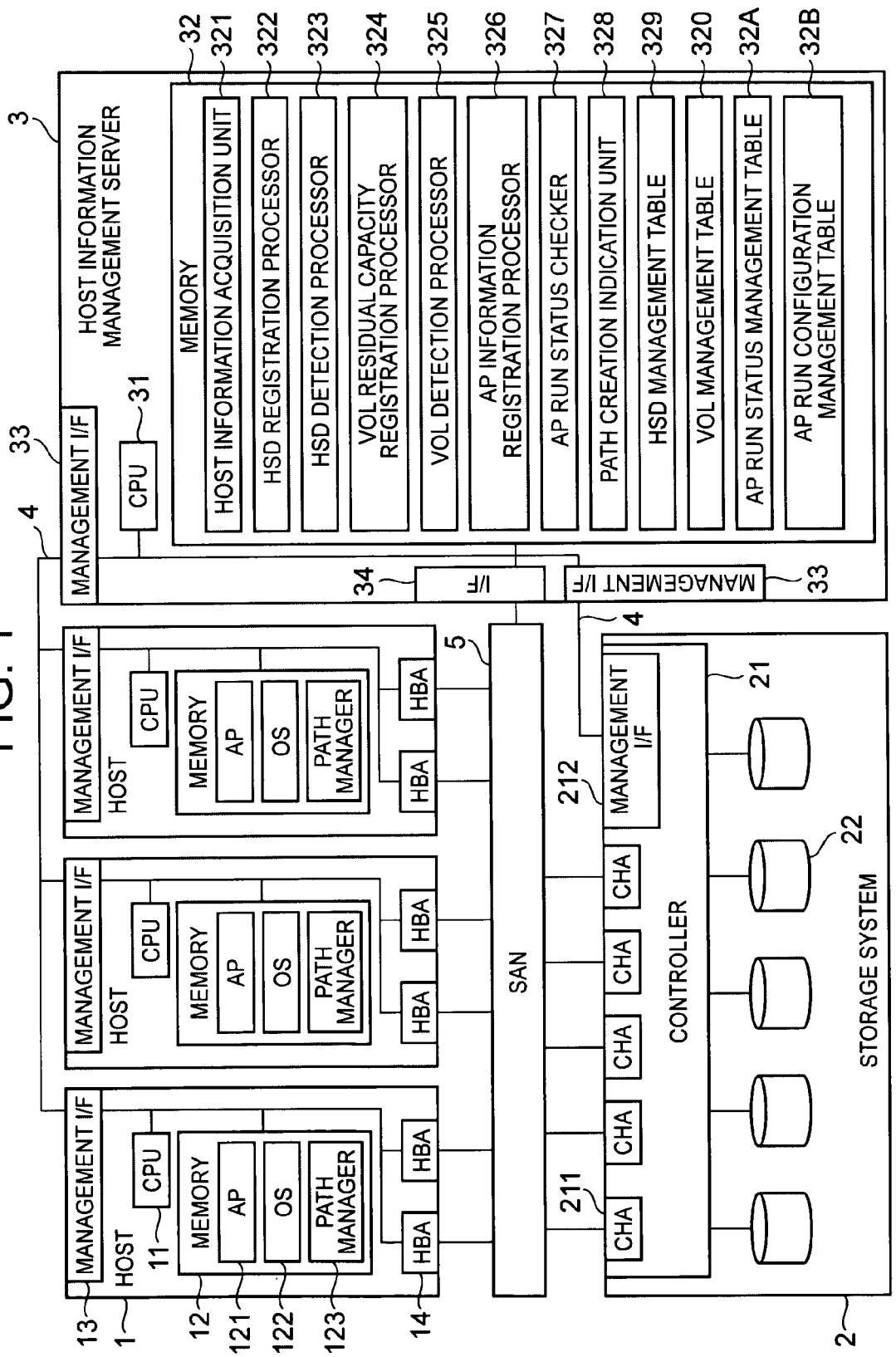
FIG. 1 is a diagram showing an example of the constitution of a computer system related to this embodiment.

In a first embodiment, a path creation support apparatus, which is an apparatus for supporting the creation of an access path from a host to the logical volume inside a storage system, comprises a group information acquisition unit; a group information storage unit; and a path creation indication unit. A plurality of the access paths is grouped together on the basis of the type of OS (Operating System) of the host that utilizes the access paths. The group information acquisition unit acquires, from the storage system, group information showing the group to which the access path utilized by the host belongs. The group information storage unit stores the acquired group information, and the type of OS of the host, which is associated with the acquired group information. The path creation indication unit, upon receipt of an access path creation start request, acquires, from the group information storage unit, group information associated with the type of OS of the host which is to carry out the access path creation, and sends to the host and the storage system an access path creation indication which specifies a parameter specified together with the access path creation start request, and the acquired group information.

In a second embodiment according to the first embodiment, the path creation support apparatus further comprises a logical volume information acquisition unit; a logical volume information storage unit; and a logical volume decision unit. The logical volume information acquisition unit acquires, from the storage system, logical volume information showing respective logical volumes that can be provided to the host by the storage system, and the residual capacities of the respective logical volumes. The logical volume information storage unit stores the acquired logical volume information, and the residual capacities of the logical volumes associated with the acquired logical volume information. The logical volume decision unit decides the logical volume to be allocated to a created access path based on the residual capacities of the respective logical volumes stored in the logical volume information storage unit. The access path creation indication further specifies logical volume information showing the logical volume decided by the logical volume decision unit.

In a third embodiment according to the second embodiment, the logical volume decision unit decides the logical volume for which the logical volume residual capacity is the largest of the logical volumes stored in the logical volume information storage unit as the logical volume to be allocated to a created access path.

In a fourth embodiment according to the second embodiment, the logical volume decision unit decides the logical volume for which the logical volume residual capacity is the closest to a pre-set threshold of the logical volumes stored in the logical volume information storage unit as the logical volume to be allocated to a created access path.

In a fifth embodiment according to any of the first through the fourth embodiments, the access path creation start request is a request to start the change of the access path. The path creation support apparatus further comprises an application information acquisition unit; application information storage unit; and path-change-time decision unit. The application information acquisition unit acquires, from the host, access information showing whether or not an application, which runs on the host and uses the access path to access a logical volume, is accessing the logical volume by utilizing a change-targeted access path, and continuously-running information showing whether or not the application is running continuously. The application information storage unit stores the access information and the continuously-running information associated with the application. The path-change-time decision unit, upon receipt of an access path change start request, references the access information and the continuously-running information associated with the application running on the host that is to carry out the access path change, and when the application is accessing the logical volume by utilizing the change-targeted access path and the application is not the continuously-running application, the path-change-time decision unit stands by until the accessing of the logical volume by the application utilizing the change-targeted access path ends, and causes the path creation indication unit to carry out an access path change indication subsequent to the end of the accessing of the logical volume utilizing the change-targeted access path.

In a sixth embodiment according to any of the first through fifth embodiments, the access path creation start request is a request to start the change of the access path. The path creation support apparatus further comprises an application information acquisition unit; application information storage unit; and alternative path switchover indication unit. The application information acquisition unit acquires, from the host, access information showing whether or not an application, which runs on the host and uses the access path to access the logical volume, is accessing the logical volume by utilizing a change-targeted access path, continuously-running information showing whether or not the application is running continuously, and alternative path information showing whether or not there is an alternative path for the access path utilized by the application. The application information storage unit stores the access information, the continuously-running information, and the alternative path information associated with the application. The alternative path switchover indication unit, upon receipt of an access path change start request, references the access information, the continuously-running information, and the alternative path information associated with the application running on the host that is to carry out the access path change, and when the application is accessing the logical volume by utilizing the change-targeted access path, the application is the continuously-running application, and there is an alternative path to the change-targeted access path, causes the path creation indication unit to carry out an access path change indication subsequent to indicating to the host to switch the access path from the change-targeted access path to the alternative path, and indicates to the host to switch the access path from the alternative path to a post-change access path subsequent to the access path change ending.

At least one of the respective units described above (the group information acquisition unit, group information storage unit, path creation indication unit, logical volume information acquisition unit, logical volume information storage unit, logical volume decision unit, application information acquisition unit, application information storage unit, path-change-time decision unit, and alternative path switchover indication unit) can be constructed from hardware, a computer program, or a combination thereof (for example, one part can be realized via a computer program, and the remainder can be realized via hardware). The computer program is executed by being read into a prescribed processor. Further, a storage region that resides in a hardware resource, such as a memory, can be used as needed when information processing is carried out by reading the computer program into the processor. Further, the computer program can be installed in the computer from a CD-ROM or other such recording medium, or downloaded to the computer via a communication network.

One embodiment of the present invention will be explained in detail below while referring to the figures. Furthermore, in explaining this embodiment, sentences having computer program as the subject actually signify that processing is being carried out by the CPU, which is executing this computer program.

FIG. 1 is a diagram showing an example of the constitution of a computer system related to this embodiment.

A plurality of hosts 1, a storage system 2, and a host information management server 3 are connected to each of a first communication network 4 and a second communication network 5. A variety of networks (for example, a LAN (Local Area Network)) can be used as the first communication network 4. A variety of networks (for example, a SAN (Storage Area Network)) can be used as the second communication network 5. Further, the first and second communication networks 4, 5 can also be a single network.

The host 1 is a computer, which accesses a logical volume (logical VOL) 22 provided by the storage system 2. The host 1, for example, comprises a CPU 11; memory 12; HBA (Host Bus Adapter) 14, which is an interface for connecting to the storage system 2; and a management I/F (interface) 13, which is an interface for connecting to the host information management server 3. The memory 12, for example, stores a prescribed application program (AP) 121, which carries out access to the logical VOL 22 provide by the storage system 2; an OS (Operating System) 122; and a path manager 123. The process carried out by the path manager 123 will be explained in detail hereinbelow.

The storage system 2, for example, can be configured as a RAID (Redundant Arrays of Independent (or Inexpensive) Disks) system, comprising a large number of storage devices (for example, hard disk drives (HDD)) arranged in an array. The storage device is not limited to HDD, but rather can comprise other types of storage devices, (for example, flash memory drives), or can be a mixture of a plurality of types of storage devices.

Figure 2:
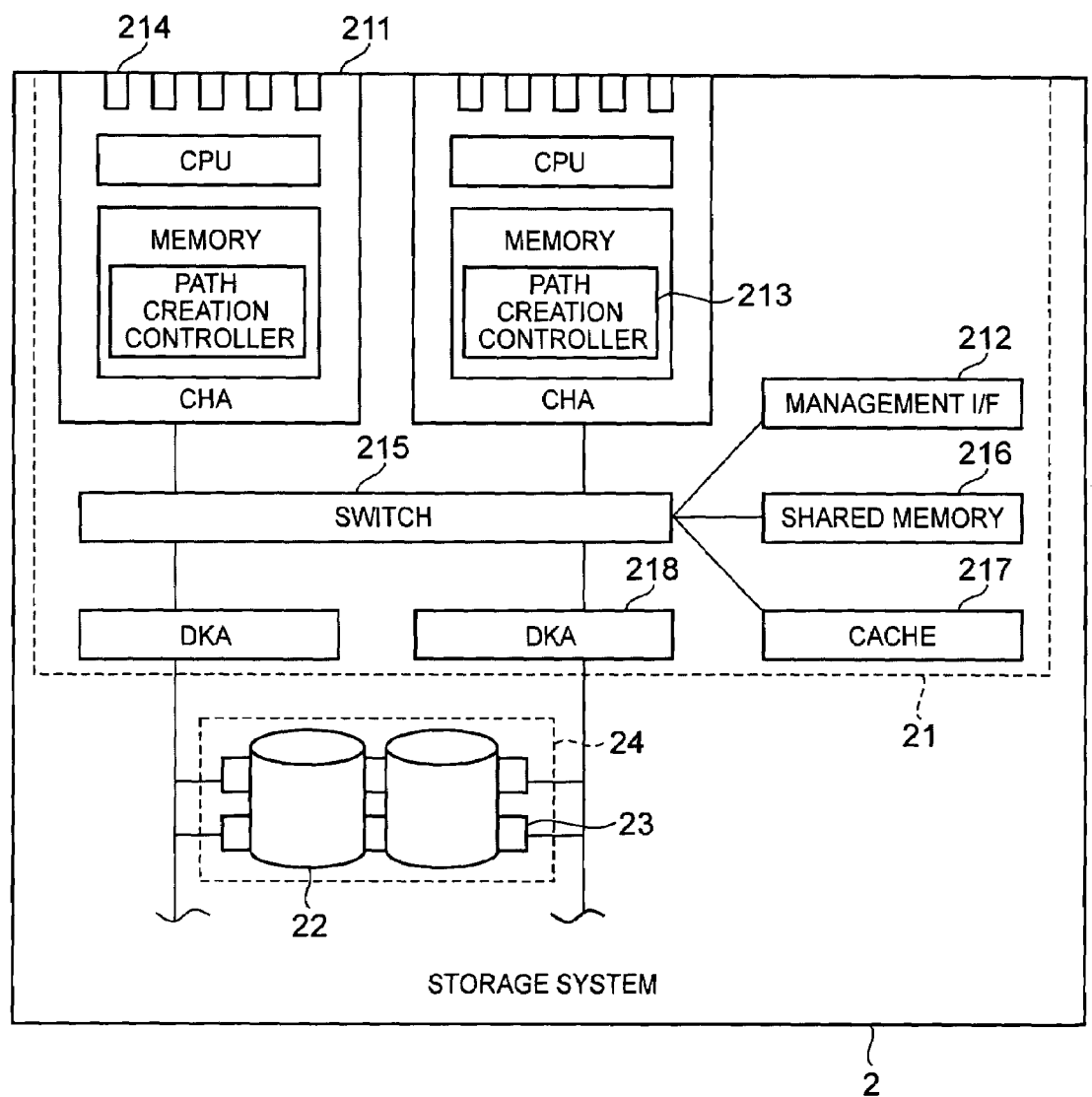
FIG. 2 is a diagram showing an example of the constitution of a storage system.

The configuration of the storage system will be explained be referring to FIG. 2. As a controller 21, for example, the storage system 2 comprises a CHA (Channel Adapter) 211, DKA (Disk Adapter) 218, switch 215, shared memory 216, cache memory (hereinafter, simply referred to as "cache") 217, and a management I/F 212, which is the interface for connecting to the host information management server 3. Access to a storage device 23 is controlled by the storage system 2 controller 21. Furthermore, for example, the functions of the storage system 2 controller 21 can be provided in an FC (Fibre Channel) switch constituting the second communication network 5, and the storage system 2 can be realized by combining this FC switch with a plurality of storage devices 23.

The CHA 211 is for carrying out data communications with the host 1, and comprises one or a plurality of communication ports 214. The CHA 211 is configured as a microcomputer system (for example, a circuit board), which comprises a CPU and a memory. The memory of the CHA 211, for example, stores a path creation controller 213. The path creation controller 213 is a computer program for creating a path inside the storage system 2 (a path from the port 214 to the logical volume 22) in accordance with an indication from the host information management server 3. The CHA 211, for example, upon receiving a write command from the host 1, respectively writes the write-targeted data to the cache memory 217, and writes the command received from the host 1 to the shared memory 216. Further, when there is a read command from the host 1, the CHA 211 writes the command received from the host 1 to the shared memory 216, and sends to the host 1 the read-targeted data, which the DKA 218 has read out from the storage device 23 and written to the cache 217.

The DKA 218 is for carrying out data communications with the respective storage devices 23. The respective DKA 218 can be configured as microcomputer systems comprising a CPU and a memory, just like the CHA 211. The DKA 218, for example, writes write-targeted data, which has been written to the cache 217 from the CHA 211, to the storage device 23, and writes read-targeted data read out from the storage device 23 to the cache 217.

The switch 215, for example, is a crossbar switch, and is a device, which interconnects the CHA 211, DKA 218, shared memory 216, cache 217, and management I/F 212. Instead of the switch 215, a bus or other type of connector can also be used.

The shared memory 216, for example, can be configured from either a nonvolatile or volatile semiconductor memory. The shared memory 216, for example, stores various types of commands received from the host 1, and control information and the like used to control the storage system 2. The commands, control information and the like can be stored redundantly using a plurality of shared memories 216.

The cache 217, for example, can be configured from either a volatile or a nonvolatile semiconductor memory. The cache 217 stores data received from the host 1, and data read out from the storage device 23. Furthermore, the shared memory 216 and cache 217 can be configured as respectively individual memories as in this embodiment, or can be configured as a single memory. When configured as a single memory, for example, one part of the memory is used as the cache area, and the other part of the same memory is used as the shared memory area.

Further, in the storage system 2, for example, one or more RAID groups 24 are configured from a plurality of storage devices 23. The RAID group 24, for example, provides a redundant storage mode based on RAID 1 or RAID 5. The logical VOL 22 is created by allocating one portion each of the respective storage areas of the plurality of storage devices 23 of the RAID group 24. The logical VOL 22 is provided to the host 1 from the storage system 2.

Returning to FIG. 1, the management server 3 is a computer for managing the host 1 and the storage system 2. The management server 3, for example, comprises a CPU 31, and a memory 32. The memory 32, for example, stores various types of computer programs, such as a host information acquisition unit 321, HSD registration processor 322, HSD detection processor 323, VOL residual capacity registration processor 324, VOL decision processor 325, AP information registration processor 326, AP run status checker 327, and path creation indication unit 328. Furthermore, the memory 32 also stores a variety of tables, such as an HSD management table 329, VOL management table 320, AP run status management table 32A, and AP run configuration management table 32B. The processing carried out by the various types of computer programs 321, 322, 323, 324, 325, 326, 327, 328, and details concerning the various type of tables 329, 320, 32A, 32B will be explained hereinbelow.

The host information management server 3 related to this embodiment carries out various processes that enable the user of the host 1 to more easily create and change an access path when the user is creating a new path (this access path) from this host 1 to the logical VOL 22 provided by the storage system 2, or when the user is changing the existing access path to a newly created access path. For example, the host information management server 3 automatically detects a portion of the parameters of the plurality of parameters required when creating or changing an access path. Consequently, the user need not input the parameters automatically detected by the host information management server 3, making it possible to lessen the parameter-inputting burden. Further, the changing of an access path must be carried out in a state in which the access path targeted for this change is not in use (that is, a state in which the AP 121 is not accessing the logical VOL 22 that utilizes this access path). When an access path change is being carried out, the host information management server 3 determines whether or not the AP 121, which uses this access path, is accessing the logical VOL 22. Then, the host information management server 3 can control the process of changing the access path in accordance with the status of this AP 121. For example, if the AP 121 is accessing the logical VOL 22, the host information management server 3 exercises control such that the access path change is carried out after this access ends.

As the parameters that the user must input when creating or changing an access path, for example, there is a parameter for specifying a newly created access path, and information showing the host storage domain (hereinafter abbreviated as "HSD") to which this newly created access path belongs. Parameters for specifying a newly created access path can include a VOL ID, which shows the logical VOL 22 that constitutes the access destination of this access path; the LUN allocated to this access path; and a port ID showing the port 214 allocated to this access path. Details concerning the HSD will be explained by referring to FIG. 12.

Figure 12:
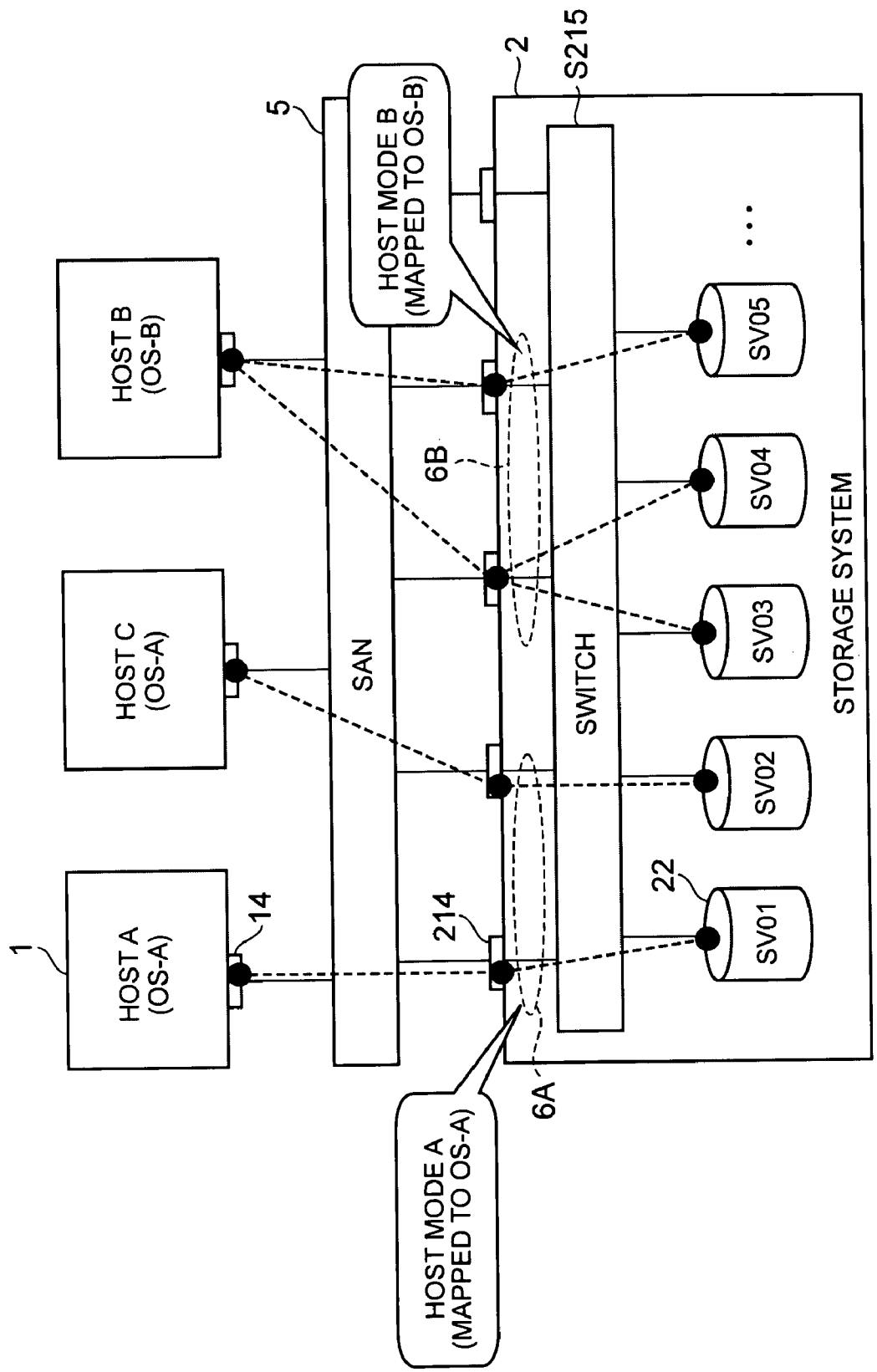
FIG. 12 is a diagram illustrating an HSD (Host Storage Domain).

FIG. 12 is a diagram illustrating an HSD (Host storage Domain).

As shown in this figure, the storage system 2—managed access paths (paths shown by the broken lines in the figure) have been grouped together. This access path group (shown by the ellipsoids in the figure) is HSD 6. In the case of this figure, the access path from host A to the logical VOL 22 "SVO1", and the access path from host B to the logical VOL 22 "SVO2" belong to HSD 6A. Further, the respective access paths from host B to logical VOL 22 "SVO3", "SVO4" and "SVO5" belong to HSD 6B. A host mode, which corresponds one-to-one with the OS type of OS 122 operating in the host 1, is associated with HSD 6. In this figure, host mode A, which is mapped to the OS type called "OS-A", is associated with HSD 6A, and host mode B, which is mapped to the OS type called "OS-B", is associated with HSD 6B. The host modes associated with HSD 6 restrict the hosts 1 that utilize the access paths belonging to this HSD 6. That is, only a host 1, which comprises the OS type OS 122 that is mapped to a host mode associated with HSD 6 can utilize the access paths belongs to this HSD 6. In this figure, the OS type of the OS 122 of both host A and host C is "OS-A". Therefore, host A and host C can utilize the access paths belonging to HSD 6A, to which host mode A, which is mapped to "OS-A", is associated. Conversely, since the OS type of the OS 122 of host B is "OS-B", host B is not able to utilize the access paths belonging to HSD 6A. In other words, the access paths utilized by hosts A and C are configured so as to belong to the HSD 6 to which the "OS-A"-mapped host mode A is associated. Similarly, the access paths utilized by host B are configured so as to belong to the HSD 6 to which the "OS-B"-mapped host mode B is associated. In accordance with the above, the storage system 2 is able to control access from the host 1 to the logical VOL 22 in accordance with the OS type of the OS 122 of the host 1.

Next, the various types of tables of the host information management server 3 (HSD 6 management table 329, VOL management table 320, AP run status management table 32A and AP run configuration management table 32B) will be explained in detail by referring to FIGS. 3 through 6. Furthermore, in the tables of the respective figures, the attached reference numerals refer to a column or field, and not to the value stored in the column or field. Therefore, in the following explanation, a reference numeral will be provided in the explanation when referring to a column or field, but a reference numeral will not be provided in the explanation when not referring to a column or field.

FIG. 3 is a diagram showing an example of an HSD management table 329.

The HSD management table 329 is for managing the correspondence between the HSD 6, host mode, and OS type. The HSD management table 329, for example, comprises columns for an HSD 3291, host mode 3292, and OS type 3293. The HSD 3291 is the column for storing information (for example, the HSD 6 name and identifier, hereinafter "HSD information") capable of uniquely identifying this HSD 6. The host mode 3292 is the column for storing information (for example, the host mode name and identifier, hereinafter "host mode information") capable of uniquely identifying the host mode associated with this HSD 6. The OS type 3293 is the column for storing the OS type, which is mapped to the host mode associated with this HSD 6.

FIG. 4 is a diagram showing an example of a VOL management table 320.

The VOL management table 320 is for managing the respective free capacities (residual capacities) of the logical VOL 22 that the storage system 2 is able to provide to the host 1. The VOL management table 320, for example, comprises columns for a VOL ID 3201 and a residual capacity 3202. The VOL ID 3201 is the column for storing the identifier of the relevant logical VOL 22 (VOL ID). The residual capacity 3202 is the column for storing the residual capacity of the relevant logical VOL 22.

A value configured in the VOL management table 320 is registered and updated by a VOL residual capacity registration processor 324. More specifically, for example, the VOL residual capacity registration processor 324, either regularly or irregularly, sends to the storage system 2 a request for acquiring the residual capacity of the logical VOL 22 registered in the VOL management table 320, and, if a logical VOL 22 has been newly added to the storage system 2, the VOL ID showing this newly added logical VOL 22 and the residual capacity of this logical VOL 22. Then, the VOL residual capacity registration processor 324 registers in the VOL management table 320 the logical VOL 22 residual capacity received from the storage system 2 in response to this request. When the VOL ID showing a newly added logical VOL 22 is notified, the VOL residual capacity registration processor 324 registers in the VOL management table 320 the information (VOL ID and residual capacity) related to this logical VOL 22.

FIG. 5 is a diagram showing an example of an AP run status management table 32A.

The AP run status management table 32A is for managing the run status (the state of access to a logical VOL 22 used by an AP 121) of the relevant AP 121 for each AP 121 running on the host 1. The AP run status management table 32A, for example, comprises columns for a host 32A1, AP 32A2, access state 32A3, and alternative path 32A4. The host 32A1 is the column for storing information (for example, the host name and identifier, hereinafter, the "host information") capable of uniquely identifying the host 1 on which the relevant AP 121 is running. The AP 32A2 is the column for storing information (for example, the AP 121 name and identifier, hereinafter the "AP information") capable of uniquely identifying the relevant AP 121. The access state 32A3 is the column for storing information showing whether or not it is a state in which the relevant AP 121 is accessing the logical VOL 22 (an access state). For example, in access state 32A3, "access" is configured when the relevant AP 121 is currently accessing the logical VOL 22, and "no access" is configured when the relevant AP 121 is not accessing the logical VOL 22. The alternative path 32A4 is the column for storing information (hereinafter, "alternative path information") showing whether or not there is an alternative path for the path (access path) from the host 1 to the logical VOL 22 being used by the relevant AP 121. For example, "Yes" is configured in the alternative path 32A4 if an alternative path exists from the host 1 to the logical VOL 22 used by the relevant AP 121, and "No" is configured when the above-mentioned alternative path does not exist.

FIG. 6 is a diagram showing an example of an AP run configuration management table 32B.

The AP run configuration management table 32B is for managing whether or not the relevant AP 121 is the continuously-running AP for each AP 121 running on the host 1. The AP run configuration management table 32B, for example, comprises columns for a host 32B1, AP 32B2, and continuously-running 32B3. The host 32B1 and AP 32B2 are the same as the host 32A1 and AP 32A2 in the AP run status management table 32A. That is, the host 32B1 column stores host information on the host 1, which is running the relevant AP 121, and the AP 32B2 column stores AP information on the relevant AP 121. Continuously-running 32B3 is the column for storing information (hereinafter, "continuously-running information") showing whether or not the relevant AP 121 is the continuously-running AP. For example, "YES" is configured in continuously-running 32B3 when the relevant AP 121 is the continuously-running AP, and "NO" is configured when the relevant AP 121 is not the continuously-running AP.

The preceding is an explanation of the configuration of the computer system related to this embodiment. The flows of various processes carried out in the host information management server 3, host 1 and storage system 2 will be explained below. Furthermore, the following respective flowcharts show overviews of the respective processes to the extent necessary to understand and implement the present invention. Therefore, a so-called person having ordinary skill in the art will be able to change the order of the steps, or change a step to a different step without departing from the scope of the present invention.

Figure 7:
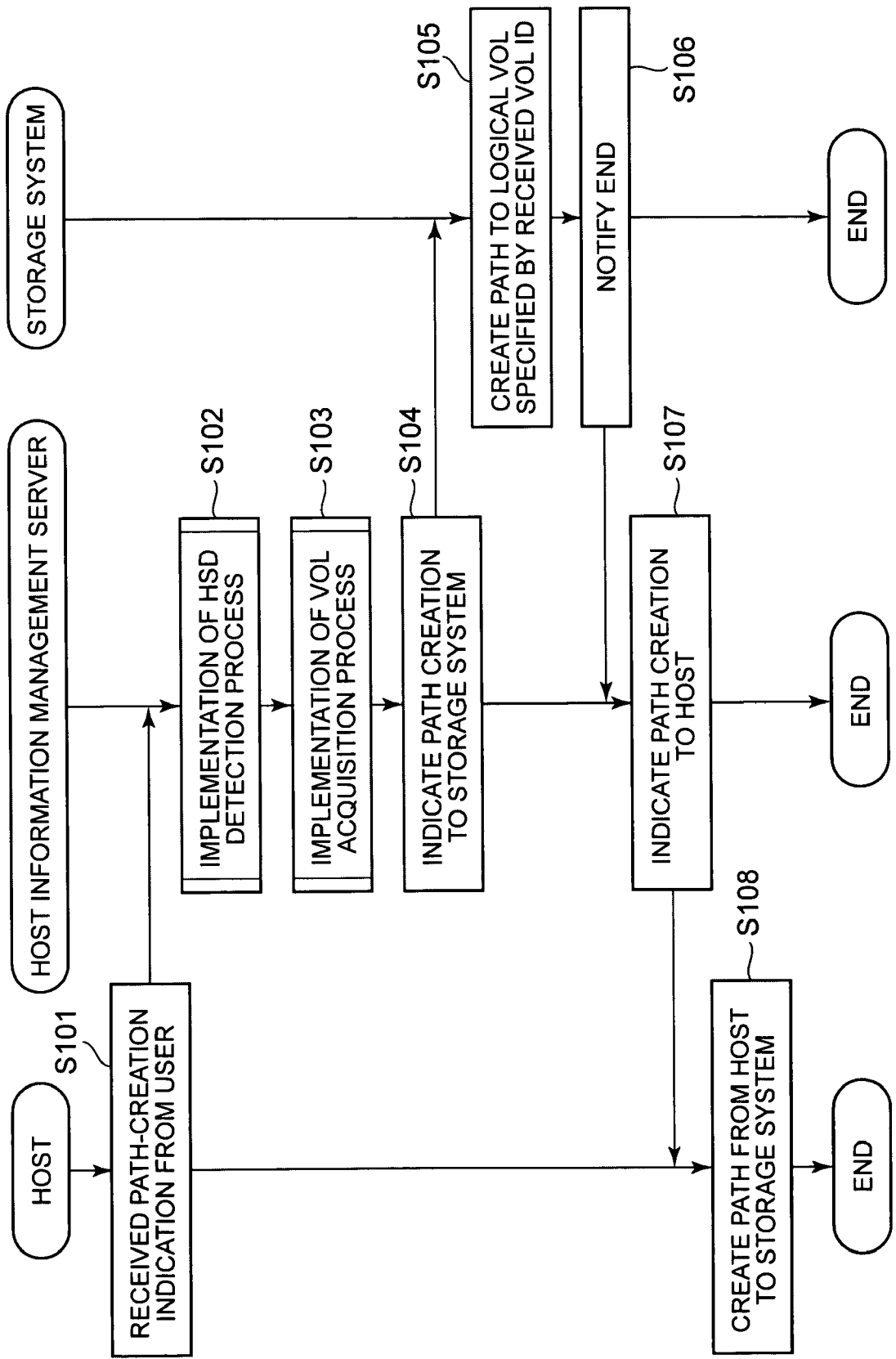
FIG. 7 is a flowchart showing the entire flow of processing for creating a new access path.

FIG. 7 is a flowchart showing the overall flow of processing for creating a new access path.

This process is started by the user of the host 1 carrying out a new access path creation indication to the host 1. When carrying out this indication, the host 1 user specifies the LUN and port ID to be allocated to a newly created access path.

First, upon receiving the access path creation indication from the user, the host 1 issues an access path creation request to the host information management server 3 (S101). In doing so, the host 1 notifies the host information management server 3 of the OS type of the OS 122 of the host 1, the AP information of the AP 121 running on the host 1, and the LUN and port ID specified from the user. Furthermore, the host 1 can also notify the host information management server 3 of the OS type and AP information beforehand prior to issuing the access path creation request. Further, the host information management server 3, upon receiving the access path creation request, can learn which host 1 issued the access path creation request. When the host information management server 3 can determine the OS type of the OS 122 of this host 1, and the AP information of the AP 121 running on this host 1 by determining the host 1 that issued this access path creation request, the host 1 does not necessarily have to notify this information (OS type and AP information) to the host information management server 3. For example, the host information management server 3 can determine the OS type and AP information related to the host 1 by maintaining a table for managing the OS type of the OS 122 of the host 1 and the AP information of the AP 121 running on the host 1 for each host 1 connected to the storage system 2.

Having received the access path creation request, the host information management server 3 carries out a process (hereinafter, "HSD detection process") for detecting the HSD 6 mapped to the host 1 (hereinafter, the "target host 1"), which issued the access path creation request (S102). The HSD detection process is carried out by an HSD detection processor 323. The HSD 6 and the host mode mapped to the target host 1 are detected by carrying out the HSD detection process, and the HSD information and host mode information, which respectively show the detected HSD 6 and host mode mapped to the target host 1, are notified to the path creation indication unit 328. The details of the HSD detection process will be explained by referring to FIG. 8 hereinbelow.

Next, the host information management server 3 carries out a process (hereinafter, the "logical VOL detection process") for detecting a suitable logical VOL 22 as the logical VOL 22 to be allocated to the newly created access path (that is, the logical VOL 22, which the AP 121 running on the target host 1 will utilize) (S103). The logical VOL detection process is carried out by the logical VOL detection processor 325. The logical VOL 22 to be allocated to a newly created access path is detected by the logical VOL detection process being carried out, and the VOL ID, which shows this detected logical VOL 22, is notified to the path creation indication unit 328. Details of the logical VOL detection process will be explained by referring to FIG. 9 hereinbelow. Furthermore, prior to carrying out the logical VOL detection process, it is desirable that the VOL residual capacity registration processor 324 update the value configured in the VOL management table 320 to the newest value.

Thereafter, the path creation indication unit 328 of the host information management server 3 sends to the storage system 2 an access path creation indication, which specifies the parameters (the HSD information and host mode information respectively showing the HSD 6 and host mode mapped to the target host 1 acquired in the HSD detection process of S102, the VOL ID, which shows the logical VOL 22 acquired by the VOL detection process of S103, and the LUN and port ID specified from the user) used in creating an access path (S104).

Upon receiving the access path creation indication, the storage system 2 uses the parameters specified from the host information management server 3 to carry out the creation of an internal path inside the storage system 2 (a path, which configures an access path, and which extends from the port 214 to the logical VOL 22) (S105) More specifically, for example, the path creation controller 213 of the storage system 2 executes a command (for example, a command called AddLUN) for creating an internal path that specifies the VOL ID, LUN and port ID specified from the host information management server 3. Furthermore, for example, when an SCSI (Small Computer System Interface) connection is used instead of an FC connection, a SCSI ID is also specified when the internal path creation command is executed. Consequently, an internal path specified by a combination of the VOL ID, LUN and port ID specified from the host information management server 3 (a path from the port 214 shown by the port ID to the logical VOL 22 shown by the VOL ID) is created. Then, the configuration of the above-mentioned created internal path is carried out such that this created internal path belongs to the HSD 6, which is shown by the HSD information specified from the host information management server 3. The host mode shown by the host mode information specified from the host information management server 3 is also used at the time of this configuration.

Subsequent to the creation of the internal path inside the storage system 2 ending, the storage system 2 notifies the host information management server 3 to the effect that internal path creation has ended (S106).

When the host information management server 3 has received the internal path creation end notification from the storage system 2, the path creation indication unit 328 of the host information management server 3 sends to the target host 1 an access path creation indication specifying the same parameters as the parameters specified in S104 (that is, the HSD information, host mode information, VOL ID, LUN and port ID) (S107).

The target host 1, which receives the access path creation indication, uses the parameters specified from the host information management server 3 to carry out the creation of a path connecting to the internal path that the storage system 2 created in S105 (S108). More specifically, the path manager 123 of the target host 1 executes a prescribed command for creating a path connecting to the internal path, which specifies the HSD information, host mode information, VOL ID, LUN and port ID specified from the host information management server 3. Consequently, a path (access path) is created from the target host 1 to the logical VOL 22 shown by the VOL ID specified from the host information management server 3.

Figure 8:
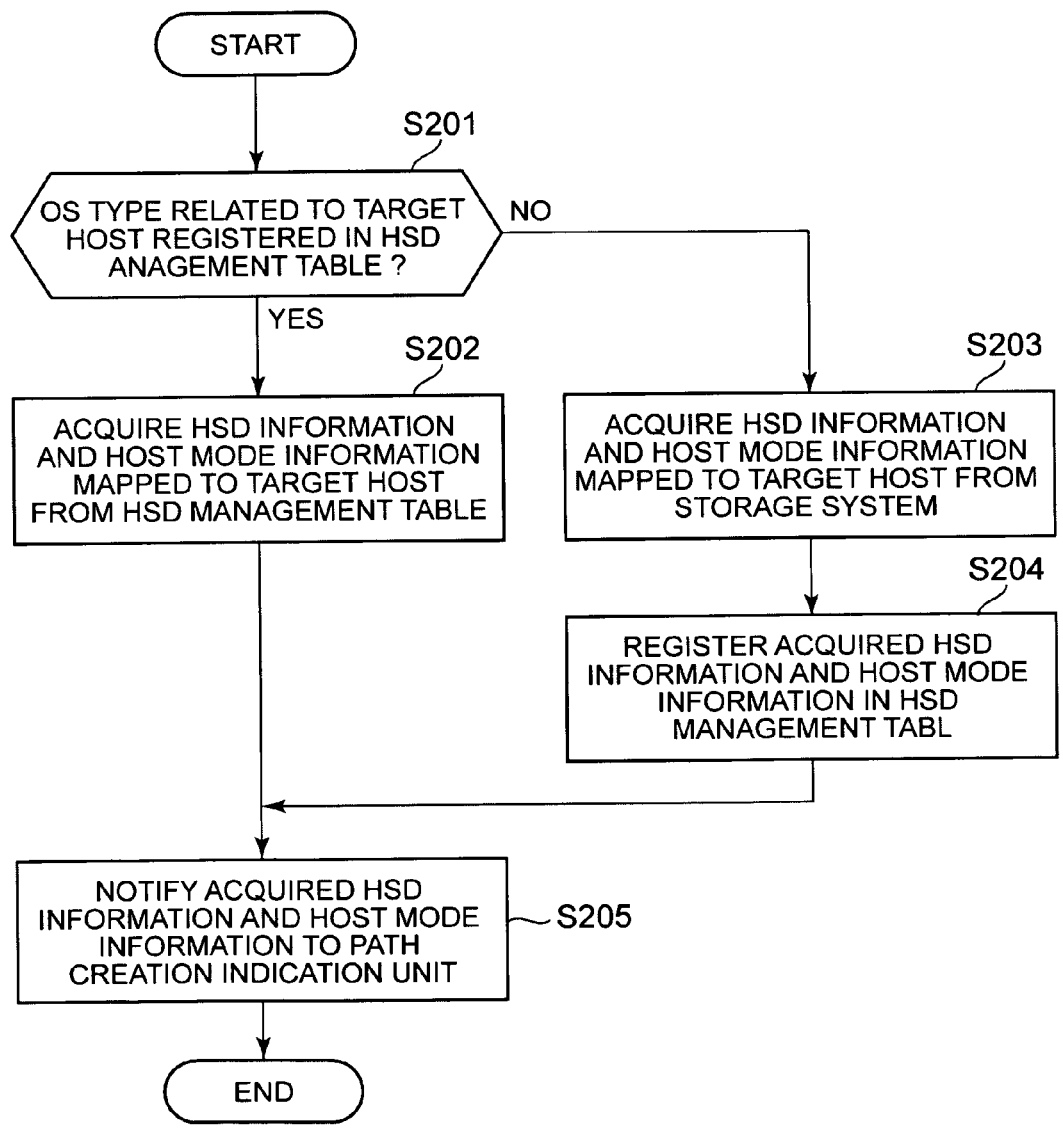
FIG. 8 is a flowchart of an HSD detection process.

FIG. 8 is a flowchart of an HSD detection process.

First, the HSD detection processor 323 determines whether or not the OS type related to the target host 1 (the OS type notified from the target host 1 in S101 of FIG. 7) is registered in the HSD management table 329 (S201).

When the OS type related to the target host 1 is registered in the HSD management table 329 (S201: YES), the HSD detection processor 323 acquires the HSD information and host mode information mapped to the target host 1 (mapped to the OS type related to the target host 1) from the HSD management table 329 (S202).

Conversely, when the OS type related to the target host 1 is not registered in the HSD management table 329 (S201: NO), a process, which acquires the HSD information and host mode information mapped to the target host 1 from the storage system 2, and registers same in the HSD management table 329, is carried out (S203, S204). This registration process is carried out by the HSD registration processor 322. More specifically, the HSD registration processor 322 sends to the storage system 2 a request to acquire the HSD information and host mode information mapped to the target host 1. On doing so, the HSD registration processor 322 notifies the storage system 2 of the OS type related to the target host 1. The storage system 2, which receives the request for acquiring the HSD information and host mode information, detects the HSD 6 and host mode mapped to the OS type notified together with this request. For example, the CHA 211 of the storage system 2 manages what host mode and OS type are associated with the HSD 6 for each HSD 6 by maintaining a mapping table. The storage system 2 can determine the HSD 6 and host mode associated with the OS type notified from the host information management server 3 by referencing this mapping table. Thereafter, the storage system 2 notifies the host information management server 3 of the HSD information showing the detected HSD 6, and the host mode information showing the detected host mode. The HSD registration processor 322 of the host information management server 3, which receives the notification of the HSD information and host mode information, associates this information with the OS type of the target host 1, and registers this information in the HSD management table 329.

Thereafter, the HSD detection processor 323 notifies the path creation indication unit 328 of the HSD information and host mode information acquired in S202 and S203.

Figure 9:
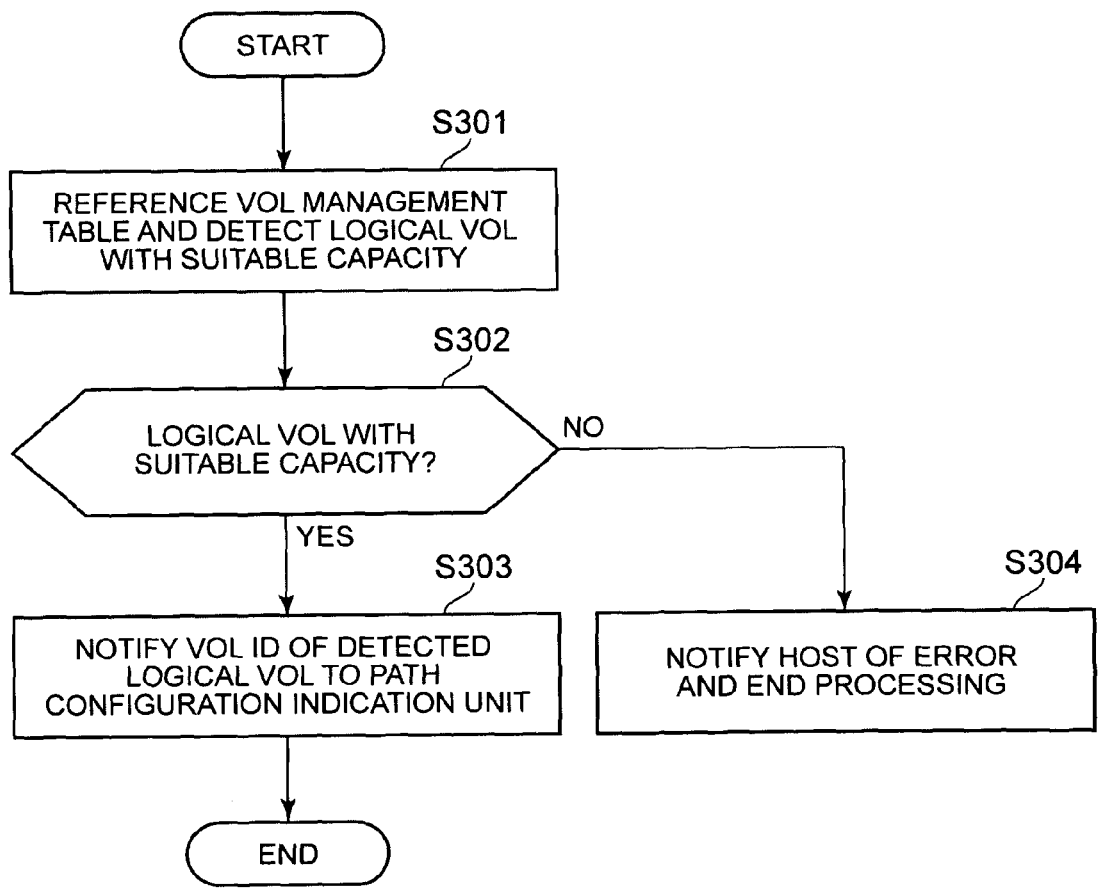
FIG. 9 is a flowchart of a logical VOL detection process.

FIG. 9 is a flowchart of a logical VOL detection process.

First, the VOL detection processor 325 references the VOL management table 320, and detects a suitable logical VOL 22 as the logical VOL 22 to be allocated to a newly created access path (that is, the logical VOL 22 to be used by the AP 121 running on the target host 1) (S301). Various criteria can be taken into consideration in determining which logical VOL 22 to use as the suitable logical VOL 22, but the VOL detection processor 325, for example, can select any one of the following three criteria to detect a suitable logical VOL 22.

(Criteria 1) Use the logical VOL 22 with the largest residual capacity as the suitable logical VOL 22. That is, in the case of this criteria 1, when there are logical VOL 22 like those shown in FIG. 4, the VOL detection processor 325 detects the logical VOL 22 having VOL ID "SVO3", which has the largest residual capacity ("1 TB (terabyte)") as the suitable logical VOL 22.

(Criteria 2) A logical VOL 22 capacity deemed the minimum required for utilizing an AP 121 (hereinafter, "AP utilization capacity") is pre-set for each type of AP of the AP 121 running on the respective hosts 1, and the logical VOL 22 having the same capacity as this pre-set AP utilization capacity, or a capacity in proximity thereof (that is, a residual capacity that is the same as or close to the above configured AP utilization capacity) is used as the suitable logical VOL 22.

(Criteria 3) The logical VOL 22 having a capacity that is greater than a pre-set threshold is used as the suitable logical VOL 22. When there is a plurality of logical VOL 22 having capacities greater than the threshold, the logical VOL 22 with the capacity closest to the threshold is used as the suitable logical VOL 22. The threshold can be configured by the user, or an average value of the residual capacity of the logical VOL 22 that can be provided to the host 1 by the storage system 2 may be used as this threshold.

Next, the VOL detection processor 325 determines whether or not a suitable logical VOL 22 was detectable in S301 (S302).

When a suitable logical VOL 22 could be detected (S302: YES), the VOL detection processor 325 notifies the path creation indication unit 328 of the VOL ID of the detected logical VOL 22 (S303).

Conversely, when a suitable logical VOL 22 could not be detected (S302: NO), the VOL detection processor 325 sends an error notification to this effect to the target host 1, and ends the access path creation process (S304).

The preceding is an explanation of the process for creating a new access path. In accordance with the above process being carried out, the host information management server 3 automatically detects the parameters necessary for creating an access path, and uses these detected parameters to create a path (an access path) from the host 1 to the logical VOL 22 of the storage system 2. Therefore, when carrying out access path creation, the user can easily create an access path by simply specifying parameters other than the parameters automatically detected by the host information management server 3 (the LUN and port ID in this embodiment).

Furthermore, in this embodiment, the host information management server 3 automatically detects the logical VOL 22 to be connected to a newly created access path, but it is not always necessary to do this. When the user wants to decide the logical VOL 22 to be allocated to a newly created access path, for example, the user can specify the VOL ID showing the logical VOL 22 when the user issues an indication to the host 1.

Figure 10:
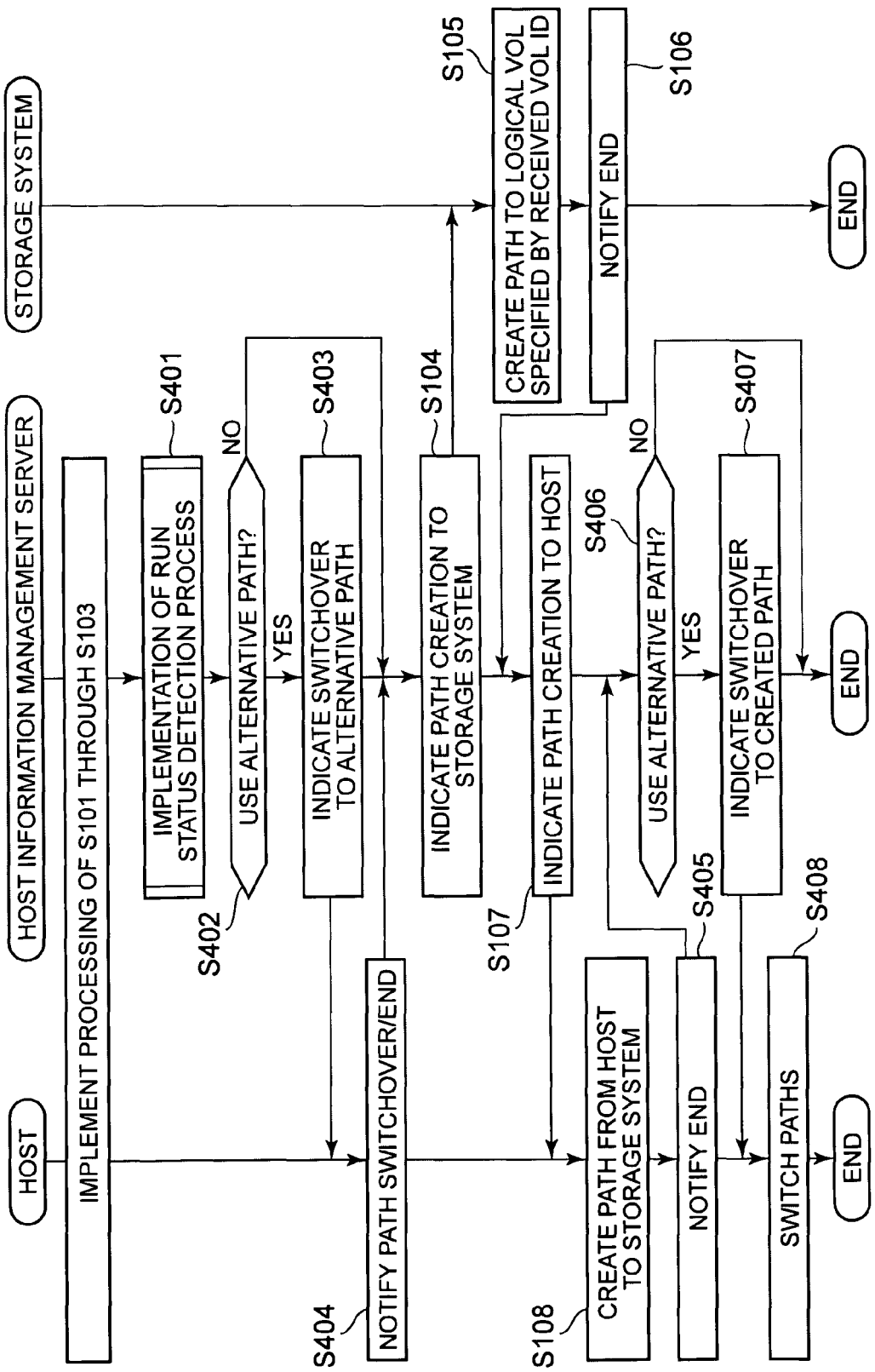
FIG. 10 is a flowchart showing the entire flow of processing for changing an existing access path to a newly created access path.

FIG. 10 is a flowchart showing the overall flow of processing for changing an existing access path to a newly created access path.

Of the respective steps comprising this process, the same symbols as the symbols used in FIG. 7 will be assigned to the steps that carry out substantially the same processing as those of FIG. 7. In the explanation of FIG. 10, the points of difference with FIGS. 7 through 9 will mainly be explained.

The process of FIG. 10 is started by the host 1 user carrying out an indication to the host 1 to change the existing access path. When carrying out this indication, the host 1 user specifies the VOL ID, LUN and port ID that specify the change-targeted access path.

First, the processing of S101 through S103 is carried out in the host 1 and host information management server 3. That is, the host 1 issues a request to the host information management server 3 to change the access path (S101). In so doing, in addition to notifying the OS type, AP information, LUN and port ID to the host information management server 3 the same as the case of FIG. 7, the host 1 also notifies the host information management server 3 of the VOL ID specified from the user (the VOL ID showing the logical VOL 22 allocated to the pre-change access path). In the explanation of FIG. 10, the host 1 that issues the access path change request to the host information management server 3 will be called the "target host 1".

The host information management server 3, which receives the access path change request, carries out an HSD detection process for detecting the HSD 6 and host mode mapped to the target host 1, which is used when creating and changing the access path (S102). The HSD detection process is substantially the same as the process explained using FIG. 8. Further, the host information management server 3 carries out a logical VOL detection process for detecting the logical VOL 22 to be allocated to the post-change access path (S103). The logical VOL detection process is substantially the same as the process explained using FIG. 9.

Next, the host information management server 3 carries out a process (hereinafter, the "AP run status check process") for checking the run status of the AP 121 running on the target host 1 (S401). The AP run status check process is carried out by the AP run status checker 327. Carrying out the AP run status check process determines whether or not the AP 121 running on the target host 1 is in the process of accessing the logical VOL 22 (in other words, whether or not the change-targeted access path is currently in use). For example, if the status of the AP 121 is access-in-progress, or if this AP is the continuously-running AP 121, the host information management server 3 transitions to standby until this access ends. Then, after this access ends, the host information management server 3 issues an indication to the storage system 2 and target host 1 to change the access path. Details concerning the AP run status check process will be explained hereinbelow by referring to FIG. 11.

Thereafter, the path creation indication unit 328 of the host information management server 3 determines whether or not an alternative path will be used when changing the access path (S402). More specifically, in the AP run status check process, when a notification to the extent that an alternative path will be used is received from the AP run status checker 327, the path creation indication unit 328 determines to utilize an alternative path, and when the above-mentioned notification is not received, the path creation indication unit 328 determines not to utilize an alternative path.

When an alternative path is not utilized (S402: NO), the path creation indication unit 328 implements the processing of S104.

Conversely, when an alternative path is utilized (S402: YES), the path creation indication unit 328 indicates to the target host 1 to switch the access path (S403).

The path manager 123 of the target host 1, which receives the access path switch indication, notifies the host information management server 3 to the extent that the access path was switched to the alternative path, and this switchover has ended (S404).

Thereafter, the processing of S104 through S108 is carried out the same as the processing of FIG. 7. Consequently, a path (access path) from the target host 1 to the logical VOL 22 of the storage system 2 is newly created using the parameters (LUN and port ID) specified from the user, and the parameters (HSD information, host mode information, and VOL ID) automatically detected by the host information management server 3. In so doing, the existing access path is changed to the newly created access path.

Upon receiving the notification from the target host 1 that access path creation has ended (S405), the path creation indication unit 328 of the host information management server 3 determines whether or not an alternative path was utilized when the access path change was carried out (S406).

When an alternative path was not utilized (S406: NO), the path creation indication unit 328 ends the access path change process.

When an alternative path was utilized (S406: YES), the path creation indication unit 328 indicates to the target host 1 to switch from the alternative path to the newly created access path (S407).

The path manager 123 of the target host 1, which receives the access path switch indication, switches the access path from the alternative path to the newly created access path (S408).

Figure 11:
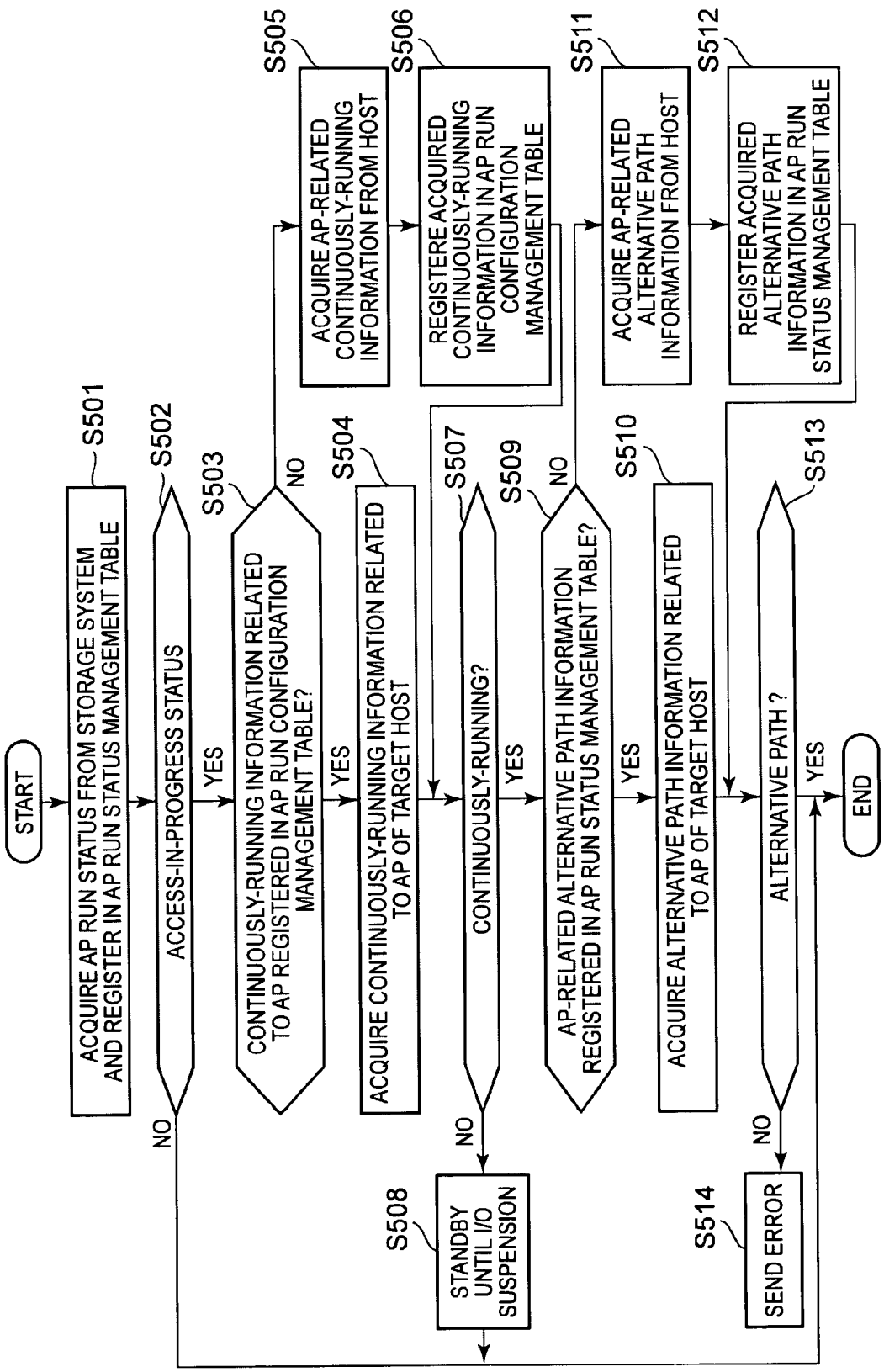
FIG. 11 is a flowchart of an AP run status check process.

FIG. 11 is a flowchart of an AP run status check process.

First, the AP run status checker 327 acquires from the storage system 2 the run status of the AP 121 (hereinafter, the "target AP 121") running on the target host 1, and registers this result in the AP run status management table 32A (S501). More specifically, the AP run status checker 327 queries the storage system 2 as to whether or not the logical VOL 22 shown by the VOL ID notified in S101 (the VOL ID of the logical VOL 22 utilized by the AP 121 running on the target host 1) is being accessed from the target AP 121 (access-in-progress status). When the result of this query is the access-in-progress status, the AP run status checker 327 configures "access" in the access status 32A3 mapped to the target AP 121 in the AP run status management table 32A. Conversely, when the result is not the access-in-progress status, the AP run status checker 327 configures "no access" in the access status 32A3 mapped to the target AP 121 in the AP run status management table 32A. Furthermore, the target AP 121 is the AP 121 shown by the AP information notified in S101.

Next, the AP run status checker 327 references the AP run status management table 32A, and determines whether or not the target AP 121 is in the access-in-progress status (S502).

When the target AP 121 is not in the access-in-progress status (S502: NO), the AP run status checker 327 ends the AP run status check process.

Conversely, when the target AP 121 is in the access-in-progress status (S502: YES), the AP run status checker 327 determines whether or not the continuously-running information related to the target AP 121 is registered in the AP run configuration management table 32B (S503).

When the continuously-running information related to the target AP 121 is registered in the AP run configuration management table 32B (S503: YES), the AP run status checker 327 acquires the continuously-running information related to the target AP 121 from the AP run status management table 32B (S504).

Conversely, when the continuously-running information related to the target AP 121 is not registered in the AP run configuration management table 32B (S503: NO), a process is carried out for acquiring the continuously-running information related to the target AP 121 from the target host 1, and registering this continuously-running information related to the target AP 121 in the AP run configuration management table 32B (S505, S506). This registration process is carried out by the AP information registration processor 326. More specifically, the AP information registration processor 326 sends to the target host 1 a request for acquiring the continuously-running information related to the target AP 121. The target host 1, which receives the request for acquiring the continuously-running information, checks whether or not the target AP 121 is the continuously-running AP, and notifies the host information management server 3 of this result as the continuously-running information. The AP information registration processor 326 of the host information management server 3, which receives this continuously-running information notification, associates the notified continuously-running information with the AP information of the target AP 121, and registers this information in the AP run configuration management table 32B.

Thereafter, the AP run status checker 327 references the continuously-running information acquired in S504 and S505, and determines whether or not the target AP 121 is the continuously-running AP 121 (S507).

When the target AP 121 is not the continuously-running AP 121 (S507: NO), the AP run status checker 327 transitions to standby until the accessing of the logical VOL 22 by the target AP 121 ends. Then, after the accessing of the logical VOL 22 by the target AP 121 has ended, the AP run status checker 327 ends the standby of S508, and ends the AP run status check process.

Conversely, when the target AP 121 is the continuously-running AP 121 (S507: YES), the AP run status checker 327 determines whether or not the alternative path information related to the target AP 121 is registered in the AP run status management table 32A (S509).

When the alternative path information related to the target AP 121 is registered in the AP run status management table 32A (S509: YES), the AP run status checker 327 acquires the alternative path information related to the target AP 121 from the AP run status management table 32A (S510).

Conversely, when the alternative path information related to the target AP 121 is not registered in the AP run status management table 32A (S509: NO), a process is carried out for acquiring the alternative path information related to the target AP 121 from the target host 1, and registering this acquired alternative path information related to the target AP 121 in the AP run status management table 32A (S511, S512). This registration process is carried out by the AP information registration processor 326, and is substantially the same as the process for registering the continuously-running information (S505, S506). That is, the AP information registration processor 326 sends to the target host 1 a request to acquire the alternative path information related to the target AP 121. The target host 1, which receives the request to acquire the alternative path information, checks whether or not an alternative path exists for the path (access path) from the target host 1 to the logical VOL 22 utilized by the target AP 121, and notifies the result thereof to the host information management server 3 as the alternative path information. The AP information registration processor 326 of the host information management server 3, which receives the alternative path information notification, associates the notified alternative path information with the AP information of the target AP 121, and registers this alternative path information in the AP run status management table 32A.

Thereafter, the AP run status checker 327 references the alternative path information acquired in S510 and S511, and determines whether or not an alternative path related to the target AP 121 (an alternative path of the access path from the target host 1 to the logical VOL 22 utilized by the target AP 121) exists (S513).

When an alternative path related to the target AP 121 does not exist (S513: NO), the AP run status checker 327 sends an error notification to this effect to the target host 1, and ends the access path change process (S514).

Conversely, when an alternative path related to the target AP 121 does exist (S513: YES), the AP run status checker 327 notifies the path creation indication unit 328 to the effect that an alternative path will be utilized when the access path change is carried out, and ends the AP run status check process. As described hereinabove, when an alternative path is utilized, the process of changing to the access path is carried out after switching the access path currently being used by the target AP 121 (that is, the change-targeted access path) to the alternative path.

The preceding is an explanation of the process for changing an existing access path to a newly created access path. By carrying out the above process, the host information management server 3 can control the host 1 and the storage system 2 such that the access path change process is carried out in a state in which this access path is not being used (a state in which the AP 121 is not using this access path to access the logical VOL 22). More specifically, the host information management server 3 exercises control such that if the AP 121 is accessing the logical VOL 22, the access path change is carried out subsequent to this access ending. Further, when the AP 121 status is access-in-progress, this AP is the continuously-running AP 121, and there is an alternative path related to this AP 121, the host information management server 3 exercises control such that access path change is carried out after switching to the alternative path (that is, after the status becomes such that the change-targeted access path is not in use) Consequently, the user can start the access path change process without having to be especially conscious of whether or not the change-targeted access path is currently in use.

The numerous embodiments of the present invention described hereinabove are examples for explaining the present invention, and do not purport to limit the scope of the present invention solely to these embodiments. The present invention can be put into practice in a variety of other modes without departing from the gist thereof.

What is claimed is:

1. A path creation support apparatus, which is an apparatus for supporting the creation of an access path from a host to a logical volume inside a storage system, a plurality of the access paths being grouped together on the basis of the type of operating system (OS) of the host that utilizes the access path the path, creation support apparatus comprising:
  a group information acquisition unit for acquiring group information from the storage system, the group information showing the group to which the access path utilized by the host belongs;
  a group information storage unit for storing the acquired group information and the type of OS of the host, which is associated with the acquired group information;
  a path creation indication unit which, upon receipt of an access path creation start request:
    acquires group information from the group information storage unit, the group information associated with the type of OS of the host which is to carry out the access path creation; and
    sends an access path creation indication to the host and the storage system which specifies a parameter, the access path creation start request, and the acquired group information;
  a logical volume information acquisition unit for acquiring logical volume information from the storage system, the logical volume information showing respective logical volumes that can be provided to the host by the storage system, and the residual capacities of the respective logical volumes;
  a logical volume information storage unit for storing the acquired logical volume information and the residual capacities of the logical volumes associated with the acquired logical volume information; and
  a logical volume decision unit for deciding a logical volume to be allocated to a created access path based on the residual capacities of the respective logical volumes stored in the logical volume information storage unit,
  wherein the access path creation indication further specifies logical volume information showing the logical volume decided by the logical volume decision unit.

2. The path creation support apparatus according to claim 1, wherein the logical volume decision unit decides the logical volume for which the logical volume residual capacity is the largest of the logical volumes stored in the logical volume information storage unit as the logical volume to be allocated to a created access path.

3. The path creation support apparatus according to claim 1, wherein the logical volume decision unit decides the logical volume for which the logical volume residual capacity is the closest to a pre-set threshold of the logical volumes stored in the logical volume information storage unit as the logical volume to be allocated to a created access path.

4. A path creation support apparatus, which is an apparatus for supporting the creation of an access path from a host to a logical volume inside a storage system, a plurality of the access paths being grouped together on the basis of the type of operating system (OS) of the host that utilizes the access path, the path creation support apparatus comprising:
  a group information acquisition unit for acquiring group information from the storage system, the group information showing the group to which the access path utilized by the host belongs;
  a group information storage unit for storing the acquired group information and the type of OS of the host, which is associated with the acquired group information;
  a path creation indication unit which, upon receipt of an access path creation start request, wherein the access path creation start request is a request to start the change of the access path:
    acquires group information from the group information storage unit, the group information associated with the type of OS of the host which is to carry out the access path creation; and
    sends an access path creation indication to the host and the storage system which specifies a parameter, the access path creation start request, and the acquired group information;
  an application information acquisition unit for acquiring access information from the host, the access information showing whether or not an application, which runs on the host and uses the access path to access a logical volume, is accessing the logical volume by utilizing a change-targeted access path, and continuously-running information showing whether or not the application is running continuously;
  an application information storage unit for storing the access information and the continuously-running information associated with the application; and
  a path-change-time decision unit which, upon receipt of an access path change start request:
    references the access information and the continuously-running information associated with the application running on the host that is to carry out the access path change,
    when the application is accessing the logical volume by utilizing the change-targeted access path and the application is not the continuously-running application, stands by until the accessing of the logical volume by the application utilizing the change-targeted access path ends, and
    causes the path creation indication unit to carry out an access path change indication subsequent to the end of the accessing of the logical volume utilizing the change-targeted access path.

5. A path creation support apparatus, which is an apparatus for supporting the creation of an access path from a host to a logical volume inside a storage system, a plurality of the access paths being grouped together on the basis of the type of operating system (OS) of the host that utilizes the access path, the path creation support apparatus comprising:
  a group information acquisition unit for acquiring group information from the storage system, the group information showing the group to which the access path utilized by the host belongs;
  a group information storage unit for storing the acquired group information and the type of OS of the host, which is associated with the acquired group information;
  a path creation indication unit which, upon receipt of an access path creation start request, wherein the access path creation start request is a request to start the change of the access path:
    acquires group information from the group information storage unit, the group information associated with the type of OS of the host which is to carrry out the access path creation; and
    sends an access path creation indication to the host and the storage system which specifies a parameter, the access path creation start request, and the acquired group information;
  an application information acquisition unit for acquiring access information from the host, the access information showing whether or not an application, which runs on the host and uses the access path to access the logical volume, is accessing the logical volume by utilizing a change-targeted access path, continuously-running information showing whether or not the application is running continuously, and alternative path information showing whether or not there is an alternative path for the access path utilized by the application;
  an application information storage unit for storing the access information, the continuously-running information, and the alternative path information associated with the application; and
  an alternative path switchover indication unit which, upon receipt of an access path change start request:
    references the access information, the continuously-running information, and the alternative path information associated with the application running on the host that is to carry out the access path change,
    when the application is accessing the logical volume by utilizing the change-targeted access path, the application is the continuously-running application, and there is an alternative path to the change-targeted access path, causes the path creation indication unit to carry out an access path change indication subsequent to indicating to the host to switch the access path from the change-targeted access path to the alternative path, and
    indicates to the host to switch the access path from the alternative path to a post-change access path subsequent to the access path change ending.

6. A path creation support method, which supports the creation of an access path from a host to a logical volume inside a storage system, a plurality of the access paths being grouped together on the basis of a type of operating system (OS) of the host that utilizes the access path, the path creation support method comprising the steps of:
  acquiring group information from the storage system, the group information showing the group to which the access path utilized by the host belongs;
  storing the acquired group information and the type of OS of the host, which is associated with the acquired group information;
  upon receipt of an access path creation start request:
    acquiring group information associated with the type of OS of the host which is to carry out the access path creation; and
    sending an access path creation indication to the host and the storage system which specifies a parameter, the access path creation start request, and the acquired group information;

acquiring logical volume information from the storage system, the logical volume information showing respective logical volumes that can be provided to the host by the storage system, and the residual capacities of the respective logical volumes;

storing the acquired logical volume information and the residual capacities of the logical volumes associated with the acquired logical volume information;

deciding a logical volume to be allocated to a created access path based on the residual capacities of the respective logical volumes stored in the logical volume information storage unit; and specifying logical volume information showing the decided logical volume by means of the access path creation indication.

7. The path creation support method according to claim 6, further comprising the step of deciding the logical volume for which the logical volume residual capacity is the largest of the stored logical volumes as the logical volume to be allocated to a created access path.

8. The path creation support method according to claim 6, further comprising the step of deciding the logical volume for which the logical volume residual capacity is the closest to a pre-set threshold of the stored logical volumes as the logical volume to be allocated to a created access path.

9. A path creation support method, which supports the creation of an access path from a host to a logical volume inside a storage system, a plurality of the access paths being grouped together on the basis of a type of operating system (OS) of the host that utilizes the access path, the path creation support method comprising the steps of:

acquiring group information from the storage system, the group information showing the group to which the access path utilized by the host belongs;

storing the acquired group information and the type of OS of the host, which is associated with the acquired group information;

upon receipt of an access oath creation start request, wherein the access path creation start request is a request to start the change of the access path:

acquiring group information associated with the type of OS of the host which is to carry out the access path creation; and sending an access path creation indication to the host and the storage system which specifies a parameter, the access path creation start request, and the acquired group information;

acquiring access information from the host, the access information showing whether or not an application, which runs on the host and uses the access path to access a logical volume, is accessing the logical volume by utilizing a change-targeted access path, and continuously-running information showing whether or not the application is running continuously;

storing the access information and the continuously-running information associated with the application; and upon receipt of an access path change start request:

referencing the access information and the continuously-running information associated with the application running on the host that is to carry out the access path change, when the application is accessing the logical volume by utilizing the change-targeted access path and the application is not the continuously-running application, standing by until the accessing of the logical volume by the application utilizing the change-targeted access path ends, and carrying out an access path change indication subsequent to the end of the accessing of the logical volume utilizing the change-targeted access path.

10. A path creation support method, which supports the creation of an access path from a host to a logical volume inside a storage system, a plurality of the access paths being grouped together on the basis of a type of operating system (OS) of the host that utilizes the access path, the path creation support method comprising the steps of:

acquiring group information from the storage system, the group information showing the group to which the access path utilized by the host belongs;

storing the acquired group information and the type of OS of the host, which is associated with the acquired group information;

upon receipt of an access oath creation start request, wherein the access path creation start request is a request to start the change of the access path:

acquiring group information associated with the type of OS of the host which is to carry out the access path creation; and sending an access path creation indication to the host and the storage system which specifies a parameter, the access path creation start request, and the acquired group information;

acquiring access information from the host, the access information showing whether or not an application, which runs on the host and uses the access path to access the logical volume, is accessing the logical volume by utilizing a change-targeted access path, continuously-running information showing whether or not the application is running continuously, and alternative path information showing whether or not there is an alternative path for the access path utilized by the application;

storing the access information, the continuously-running information, and the alternative path information associated with the application; and upon receipt of an access path change start request:

referencing the access information, the continuously-running information, and the alternative path information associated with the application running on the host that is to carry out the access path change, when the application is accessing the logical volume by utilizing the change-targeted access path, the application is the continuously-running application, and there is an alternative path to the change-targeted access path, carrying out an access path change indication subsequent to indicating to the host to switch the access path from the change-targeted access path to the alternative path, and indicating to the host to switch the access path from the alternative path to a post-change access path subsequent to the access path change ending.

* * * * *